United States Patent [19]
Weller

[11] 3,856,613
[45] Dec. 24, 1974

[54] COMPRESSIBLE ENERGY ABSORBING ARTICLE

[75] Inventor: Peter A. Weller, Durham, N.H.

[73] Assignee: McCord Corporation, Detroit, Mich.

[22] Filed: Aug. 28, 1972

[21] Appl. No.: 284,318

[52] U.S. Cl............ 161/116, 161/159, 267/140, 293/71 R, 293/72, 293/88
[51] Int. Cl. ...... B32b 5/08, B32b 7/08, B60r 19/04
[58] Field of Search .......... 52/167, 716; 161/39, 77, 161/89, 96, 144, 159, 160, 161, 168, 170, 161/178, 5, 55, 60, 68, 69, 116; 267/140, 141, 267/152, 153; 293/1, 71 R, 88, 63, 72

[56] References Cited
UNITED STATES PATENTS

| | | | |
|---|---|---|---|
| 1,985,113 | 12/1934 | Smith | 293/71 R |
| 2,493,032 | 1/1950 | Rheinfrank, Jr. | 161/69 |
| 2,706,112 | 4/1955 | Carrier et al. | 267/153 |
| 3,103,042 | 9/1963 | Martin | 161/69 X |
| 3,471,979 | 10/1969 | Herr | 52/716 X |
| 3,473,836 | 10/1969 | Halter | 293/71 R |
| 3,493,257 | 2/1970 | Fitzgerald et al. | 293/71 R |
| 3,565,734 | 2/1971 | Shanok et al. | 161/5 |
| 3,644,168 | 2/1972 | Bonk et al. | 161/161 X |
| 3,679,196 | 12/1969 | Royer | 267/140 |
| 3,694,018 | 9/1972 | Levering | 293/88 |

FOREIGN PATENTS OR APPLICATIONS 96,263  6/1960  Norway.................. 161/68

Primary Examiner—M. Henson Wood, Jr.
Assistant Examiner—Howard Beltran
Attorney, Agent, or Firm—McGlynn and Milton

[57] ABSTRACT

An energy absorbing article taking the form of an automotive bumper having a core means made of compressible energy absorbing plastic material. The cross section of the bumper is contoured such that the upper portion is of a major thickness thicker than the lower portion which is of a minor thickness. Two embodiments of energy transfer means for transferring and distributing energy between the minor and major thicknesses are disclosed. In the first embodiment there is included a plurality of overlapping first and second plates disposed in a scissors-like fashion whereby upon impact against the energy absorbing material at the minor thickness, the energy absorbing material between the upper portion of the plates will be compressed thus transferring energy to the major thickness. In the other embodiment, a plate-like member is attached to a pivot point at its lower end and as the minor thickness is compressed the plate will pivot about its lower end to compress the material in the major thickness of the bumper. The employment of the subject invention allows a bumper to be configured having a relatively thin thickness but which will meet energy absorbing requirements.

23 Claims, 4 Drawing Figures

PATENTED DEC 24 1974 3,856,613

COMPRESSIBLE ENERGY ABSORBING ARTICLE

This invention relates to an energy absorbing article and more specifically to an automotive bumper.

Automotive bumpers must meet certain safety requirements and one of these safety requirements is one wherein the bumper must absorb a predetermined amount of energy. One manner in which such energy may be absorbed is by the use of a bumper made of an energy absorbing material such as a compressible plastic. Bumpers have various heights but must be capable of absorbing the required amount of energy regardless of the vertical point of impact. At the same time stylists wish to configure the exterior of the bumper so that the bumper has various thicknesses for aesthetic appearances. The stylist's desires have not been totally satisfied because in order to contour a bumper for aesthetic purposes which results in various thicknesses of energy absorbing material, the thinnest thickness of the bumper as viewed in cross section must be capable of absorbing the required energy plus a given safety factor. This, of course, would require the major thickness of such a bumper to be so thick as to be impractical.

Accordingly, it is an object and feature of this invention to provide an energy absorbing article including a core means made of compressible energy absorbing material and having a major thickness and a thinner minor thickness as viewed in cross section with energy transfer means for transferring energy between the minor and major thicknesses whereby a bumper may be fabricated having an acceptable major thickness yet satisfing energy absorbing requirements when impacted at the lesser minor thickness.

In correlation with the foregoing object and feature, it is another object and feature of this invention to provide such an energy absorbing article wherein the energy transfer means is embedded in the energy absorbing material and includes at least one member extending between the minor and major thicknesses.

In correlation with the foregoing objects and features, it is another object and feature of this invention to provide such an energy absorbing article wherein the member includes a surface which moves to compress the energy absorbing material.

In correlation with the foregoing objects and features, it is another object and feature of this invention to provide such an energy absorbing article wherein the surface which moves to compress the energy absorbing material is disposed in the major thickness for compressing the material of the major thickness as energy is transferred thereto from the minor thickness.

Other objects and attendant advantages of the present invention will be readily appreciated as the same becomes better understood by reference to the following detailed description when considered in connection with the accompanying drawings wherein.

Figure 1:
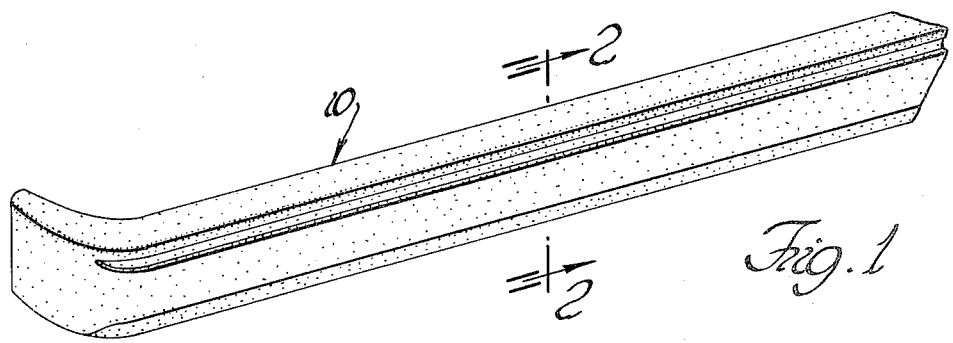
FIG. 1 is a perspective view of an energy absorbing article taking the form of an automotive bumper constructed in accordance with the instant invention.
Figure 2:
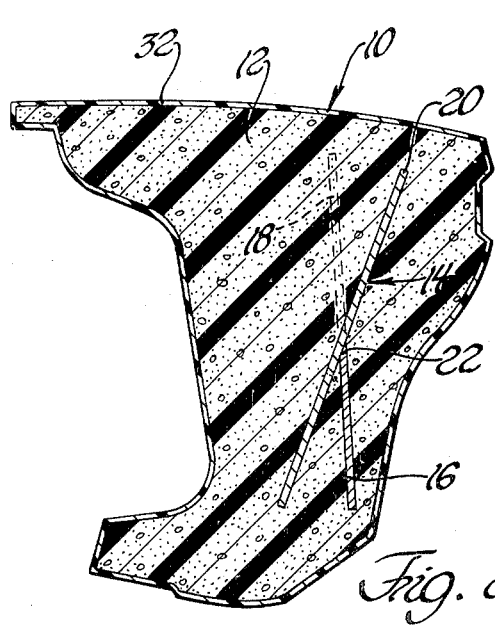
FIG. 2 is an enlarged cross-sectional view taken substantially along line 2—2 of FIG. 1.
Figure 4:
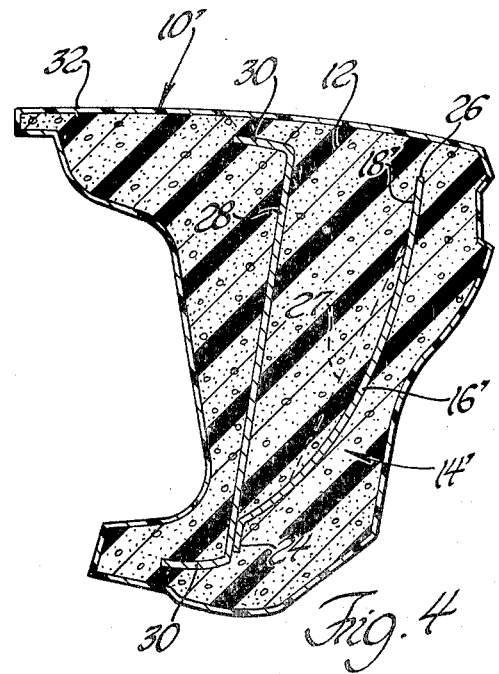
FIG. 4 is a cross-sectional view similar to FIG. 2 but showing an alternative embodiment.

Referring now to the drawings, alternative embodiments of an energy absorbing article taking the form of an automotive bumper is generally indicated at 10 and 10'. The bumpers 10 and 10' include a core means 12 made of compressible energy absorbing material such as plastic, preferably a urethane. As best illustrated in FIGS. 2 and 4, the core means 12, as viewed in cross section, has at the upper end thereof a major thickness which is thicker than the thinner minor thickness disposed at the lower end thereof. The bumpers 10 and 10' include energy transfer means, respectively generally indicated at 14 and 14', for transferring energy between the minor and major thicknesses of the bumper. Each of the energy transfer means 14 and 14' is embedded in the energy absorbing material of the core means 12.

The energy transfer means includes at least one member extending between the minor and major thicknesses. In the case of the bumper 10 that member is indicated at 16 and in the case of the bumper 10' that member is indicated at 16'. Both members 16 and 16' are plate-like so as to include an effective working surface which moves to compress or otherwise move the material of the core 12. In the case of the bumper 10 that surface is indicated at 18 and in the case of the bumper 10' that surface is indicated at 18'. The surfaces 18 and 18' are disposed in the major thickness of the respective bumpers for compressing the material of the respective major thicknesses as energy is transferred thereto from the minor thickness. In other words, when the lower portion of the bumpers 10 and 10', which is defined by the minor thicknesses, is impacted by a force part of the energy of that force moves the surfaces 18 and 18' so as to compress the energy absorbing material of the major thickness of the respective bumpers. The surfaces 18 and 18' extend in the same general direction as the members 16 and 16' as they extend from the minor thickness to the major thickness in the respective bumpers.

Each bumper 10 and 10' also includes fulcrum means for establishing a position about which the members 16 and 16' rotate for moving the surfaces 18 and 18' to compress the energy absorbing material of the major thickness in response to a compressive force being applied to the minor thickness.

Figure 3:
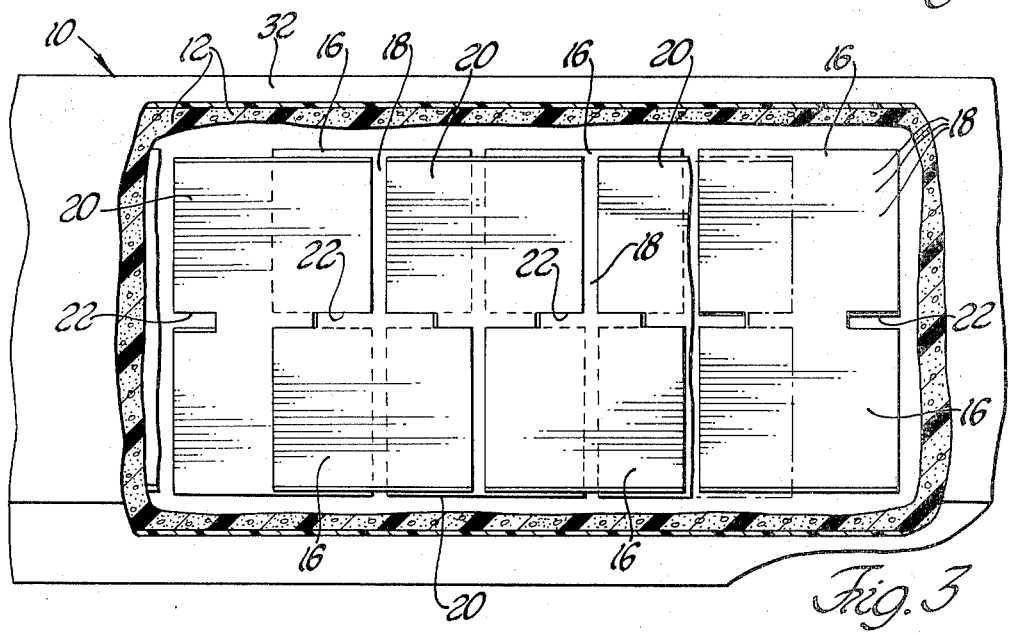
FIG. 3 is an enlarged fragmentary broken away view looking at the front face of the bumper of FIGS. 1 and 2.

In the case of the bumper 10 the member 16 comprises a first plate and the fulcrum means comprises a like second plate 20. There is also included scissor means for disposing the plates 16 and 20 in crossing scissors-like relationship with one another. More specifically, the scissors means includes slot 22 extending into opposite sides of the generally rectangular shaped plates 16 and 20. Each plate 16 is disposed in the slot 22 of a second plate 20 and vice versa. As is best illustrated in FIG. 3, the bumper 10 includes a plurality of the first and second plates 16 and 20 and the first plates 16 are adjacent or in general alignment with one another and overlap the similarly disposed second plates 20 whereby the energy absorbing material of the core 12 may be compressed between the plates 16 and 20.

In the case of the bumper 10' the fulcrum means is disposed at the lower or first end of the plate 16', which end is indicated at 24 and is disposed in the minor thickness of the core 12. The second or upper end of the plate 16' is indicated at 26 and is disposed in the major thickness of the core 12. The plate 16' may take various configurations but as illustrated extends generally outwardly from the first end 24 thereof towards the front surface or front face of the bumper 10', as defined by the minor thickness thereof, and then generally parallel to that surface upwardly to the second end 26. Although not necessary a plurality of strengthening ribs 27 may be disposed along the plate member 16'. The fulcrum means in the bumper 10' comprises a plate 28 extending from the first end 24 of the plate 16' toward the major thickness and which is in spaced relationship to the plate 16' whereby material may be compressed therebetween. The plate 28 has flanges 30 at each end thereof and forms a substantial anchor so as to act as a fulcrum or pivot at the lower end 24 of the plate 16'. Preferably the lower end 24 of the plate 16' is welded or otherwise secured to the plate 28.

Both bumpers 10 and 10' include a skin 32 disposed about the plastic material of the core 12.

Thus, if the bumper 10 is impacted at a lower portion, i.e., the minor thickness thereof, the plate-like members 16 rotate about the crossing thereof with the plates 20 so that the upper surface 18 thereof moves forwardly to compress the plastic material between the plates 16 and 20. At the same time of course there will be compression of the energy absorbing material of the core at the minor thickness thereof. The important factor is however that energy resulting from the impact at the minor thickness thereof is transferred to the major thickness thereof so that the major thickness absorbs energy even though the impact occurred at the minor thickness.

Upon impact at the minor thickness of the bumper 10' the plate 16' rotates about the lower end 24 so as to move the compressive material adjacent the surface 18' rearwardly to compress it against the plate 28.

In both bumpers all that is needed are the surfaces 18 and 18' to be moved so as to move the material of the major thicknesses. In other words, the bumper will be firmly supported on the automobile and the material need not be compressed between two adjacent members because all that is needed are the surfaces 18 and 18' which move to move the material of the major thickness whereby the energy is absorbed by the material of the major thickness upon impact at the minor thickness.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An energy absorbing article comprising: core means made of compressible energy absorbing material and having a top and bottom interconnected by a front and back with one of said top and bottom being thinner in thickness than the other as viewed in cross section, and energy transfer means for transferring energy between said top and bottom, and vice versa, in response to a frontal impact, said energy transfer means including at least one member embedded within said energy absorbing material and fulcrum means for establishing a position about which said member may rotate in response to said impact.

2. An article as set forth in claim 1 wherein said energy absorbing material comprises a compressible plastic.

3. An article as set forth in claim 1 wherein said energy transfer means is embedded in said energy absorbing material.

4. An article as set forth in claim 3 wherein said energy transfer means includes at least one member extending between said minor and major thicknesses.

5. An article as set forth in claim 4 wherein said member includes a surface which moves to compress said material.

6. An article as set forth in claim 5 wherein said surface is disposed in said major thickness for compressing the material of said major thickness as energy is transferred thereto from said minor thickness.

7. An article as set forth in claim 6 wherein said surface extends in the same general direction as said member extends from said minor thickness to said major thickness.

8. An article as set forth in claim 7 including fulcrum means for establishing a position about which said member rotates for moving said surface to compress the material of said major thickness in response to a compressive force being applied to said minor thickness.

9. An article as set forth in claim 8 wherein said member comprises a first plate and said fulcrum means comprises a like second plate, and scissor means for disposing said plates in crossing scissors-like relationship with one another.

10. An article as set forth in claim 9 wherein said scissor means includes slots extending into said plates with said first plate being disposed in the slot of said second plate and vice versa.

11. An article as set forth in claim 9 including a plurality of said first and second plates.

12. An article as set forth in claim 11 wherein said first plates are adjacent one another and overlap similarly disposed second plates.

13. An article as set forth in claim 12 wherein said energy absorbing material comprises a compressible plastic.

14. An article as set forth in claim 13 including a skin disposed about said plastic material.

15. An article as set forth in claim 8 wherein said fulcrum means is disposed at the first end of said member which is disposed in said minor thickness.

16. An article as set forth in claim 15 wherein said member comprises a plate having its second end disposed in said major thickness.

17. An article as set forth in claim 16 wherein said plate extends generally outwardly from said first end thereof toward the surface of said minor thickness and then generally parallel to said surface to said second end thereof.

18. An article as set forth in claim 17 wherein said fulcrum means comprises a plate extending from said first end of said plate toward said major thickness and in spaced relationship with said plate.

19. An article as set forth in claim 8 wherein said energy absorbing material comprises a compressible plastic.

20. An article as set forth in claim 19 including a skin disposed about said plastic material.

21. An energy absorbing assembly comprising: core means made of compressible energy absorbing material, and energy transfer means for transferring energy between different portions of said material, said transfer means including first and second plates and scissors means for disposing said plates in crossing scissors-like relationship with one another so that the portions of said plates on one side of said scissors means will move relative to one another in response to movement of the portions of said plates on the opposite side of said scissors means whereby energy may be transferred by said plates to said energy absorbing material on said one side of said scissors means in response to said movement thereof on said opposite side of said scissors means.

22. An assembly as set forth in claim 21 including a plurality of said first and second plates.

23. An assembly as set forth in claim 22 wherein said first plates are adjacent one another and overlap similarly disposed second plates.

* * * * *